United States Patent [19]

Ewertowski

[11] 4,012,830
[45] Mar. 22, 1977

[54] TOOL CHANGER FOR HORIZONTAL DRILLING-MILLING MACHINES

[75] Inventor: Norbert Ewertowski, Dietzenbach-Steinberg, Germany

[73] Assignee: Werkzeugmaschinenfabrik Oerlikon-Bührle AG, Zurich, Switzerland

[22] Filed: Mar. 17, 1975

[21] Appl. No.: 559,220

[30] Foreign Application Priority Data

Mar. 22, 1974 Switzerland .................. 4008/74

[52] U.S. Cl. .................................................. 29/568
[51] Int. Cl.² ........................................ B23Q 3/157
[58] Field of Search .................................. 29/568

[56] References Cited

UNITED STATES PATENTS

| | | | |
|---|---|---|---|
| 3,348,298 | 10/1967 | Sedgwick | 29/568 |
| 3,616,526 | 11/1971 | Tajima | 29/568 |
| 3,760,491 | 9/1973 | Zankl et al. | 29/568 |
| 3,789,501 | 2/1974 | Kurimoto et al. | 29/568 |

Primary Examiner—Frank T. Yost
Assistant Examiner—Z. R. Bilinsky
Attorney, Agent, or Firm—Werner W. Kleeman

[57] ABSTRACT

A tool change mechanism for horizontal drilling-milling machines comprising a magazine, a tool spindle, the tools being arranged substantially horizontally and at right-angles to the tool spindle in the magazine. A gripper rocker having a gripper rocker shaft disposed substantially parallel to the work spindle is mounted in a gripper carriage, said gripper carriage being displaceable in the direction of the work tool spindle for the introduction and the removal of the tools, said gripper carriage possessing a double pivotal gripper vane rotatable through an angle of approximately 180°. Guide tracks are arranged at the magazine, said gripper carriage being displaceable at the guide tracks by means of two coupled drives into at least four positions, one drive being attached at the gripper carriage and one drive being stationarily supported in the direction of the guide tracks. A gripper arm carrying the gripper vane is pivotably mounted at the gripper rocker such that its gripper arm shaft is directly and non-displaceably mounted in the gripper rocker and the gripper arm shaft and its extension intersects in spaced relation and at substantially right-angles the gripper rocker shaft. The gripper rocker and the gripper arm are pivotable such that the symmetry axes of the gripper tongs of the gripper vane in a magazine position of the gripper vane are directed substantially parallel to the tool spindle and in a tool spindle position of the gripper vane the symmetry axes of the gripper tongs located at the tool spindle are disposed at right-angles to the tool spindle as well as at right-angles to a connection line between the gripper rocker shaft and the tool spindle shaft at the center point of the tool spindle shaft.

4 Claims, 7 Drawing Figures

4,012,830

TOOL CHANGER FOR HORIZONTAL DRILLING-MILLING MACHINES

BACKGROUND OF THE INVENTION

The present invention relates to a new and improved construction of tool or tool changing device for horizontal drilling-milling machines of the type incorporating a magazine located adjacent the machine in which there are arranged the tools horizontally and at right-angles to a tool spindle, there also being provided a gripper rocker or balance equipped with a gripper rocker shaft mounted parallel to the tool spindle in a gripper carriage which is displaceable in the direction of the tool spindle for the introduction and removal of the tools and which possesses a doubly pivotable gripper vane or wing which is rotatable through an angle of 180°.

With heretofore known tool changers of such type (known in the trade under the designations HELLER BEA, BURR TC 22, BOHLE W 1) each gripper tong or clamp is displaceable through the agency of a gripper slide arranged in the gripper vane rotatable at the gripper rocker. With both of the first mentioned tool changers during the first operating phase there is carried out a tool change of the "new" tool out of the magazine by means of a gripper slide and such is then transferred into a so-called park position where it stands ready at the tool spindle for the tool change after the presently continuing working operation with the "old" tool has been terminated. For transferring the "new" tool out of the park or distribution position into the tool spindle, with the three previously mentioned constructions of tool changing devices the gripper vane initially is rocked by the gripper rocker in front of the headstock and thereafter the empty gripper tong is displaced out of the gripper vane by means of its gripper slide in order that it can engage the old tool located in the tool spindle. After the axial ejection out of the tool spindle by means of the gripper slide for the purpose of returning the old tool the corresponding gripper slide initially is retracted into the gripper vane, whereupon the gripper rocker or balance is pivoted back out of the region of the headstock. For the transfer from the park or distribution position into the tool spindle position and vice versa there are also required two respective functional steps with two respective acceleration- and two respective deceleration phases which are carried out in succession since the momentary thrust movement of the gripper slide during the infeed first can occur after the pivotal operation of the gripper rocker has terminated and during the return movement the pivoting back of the gripper slide first can occur after the gripper arms have been retracted.

This type of infeed and retraction of the tools with a pivotal guide, two gripper slides located in a rotatable gripper vane, with two associated longitudinal guides as well as a longitudinal guide for the introduction and removal of the tools is time-consuming, complicated and prone to disturbances, especially if there is considered that longitudinal guides generally are more complicated and sensitive to casting dust as well as chip fly or dust than pivotal guides.

These prior art constructions in the case of small workpieces which are clamped centrally at the workpiece table do not permit the tool exchange operation in the lower region of the Y-position of the tool spindle above the workpiece table, because the axis of rotation of the gripper vane during the tool exchange is located in a horizontal plane with the tool spindle. Consequently, in such instances the workpiece table and the machine frame, respectively, must be displaced further than is necessary for achieving an accessible position, likewise resulting in losses in time. This drawback is particularly then present when the catch plate of the chip transport installation is extended upwardly between the workpiece table and the machine frame in an advantageous manner to the table support surface.

The discussed tool changers are components of the machine, in other words installed at the machine frame or stand. Thus it is not readily possible to selectively fabricate in a rational manner the machines with or without the tool changer. Additionally, there are possible deleterious effects upon the accuracy of the machines, since for instance during the working operation which is in progress there must occur at the magazine functional steps or operations for the next tool change.

A different but related type of tool changer for horizontal drilling-milling machines equipped with a headstock displaceable in the spindle direction is erected adjacent the machine and independently thereof (known as SAALFELD C 101 NC). For the tool change operation the headstock is always displaced into its rearward terminal position in which the tool spindle is positionally related to the tool changer. The drawbacks mentioned in the immediately preceding paragraph are in this case avoided, but however there exists the drawback that in the case of short and average length tools as well as in the case of smaller workpieces clamped at the center of the table the spindle slide or carriage must move through an unnecessarily long distance for the tool change operation. Consequently, there are present losses in time and increased wear and tear with respect to the spindle carriage guide responsible for the working accuracy of the machine. Additionally, what is disadvantageous is that the tool gripper requires a special stand or frame in order to be able to carry out the tool change operation in each elevational position of the spindle carriage.

A further related type of tool changer for horizontal drilling-milling machines equipped with a machine frame displaceable in the spindle direction is likewise erected independent of the machine (known as KEARNEY & TRECKER MODU-LINE). For the tool change operation in this case the machine frame is displaced into its rearward terminal position where the work spindle is positionally related with respect to the tool changer. The indicated disadvantages present when the tool changer is mounted at the machine are equally avoided, but instead there also exists in this instance the drawback that when handling short and average length tools and smaller workpieces the machine frame must carry out an unnecessarily long displacement for the tool change operation.

In the case of a tool changer of a different type for vertical drilling-milling machines, which likewise is erected independently adjacent the machine, the tools are horizontally maintained in a disk magazine. In this regard attention is directed to German Pat. No. 2,110,943. During the first phase of a tool change operation a magazine spindle sleeve or tail spindle displaces at the magazine the new tool at a change head (gripper vane) rotatable through 180° which contains the tool gripper and mounted at the end of a carrier which —similar to the case of industrial robots— is pivotable and rotatable through 90° as well telescopically displaceable. During the further course of the operation the new tool is brought into the park or distribution position by simultaneously pivoting and rotating the carrier. The transfer of the new tool out of the park position to the tool spindle —as well as vice versa— occurs by means of the telescopic displacement of the carrier. For the axial ejection as well as introduction of the work at the work spindle both of the gripper tongs or clamps at the change head are additionally displaceable by means of a respective gripper slide and associated guides. This tool changer is only suitable for machines with vertical work spindle and it avoids the drawbacks of the previously mentioned constructions. With respect to the considered portion of the course of the movement it however requires one tail spindle displacement, one carrier displacement, two gripper displacements, one carrier rotation, and one carrier pivoting movement. Since the carrier is pivotable at a special support frame, located between the machine and the magazine, there are present drawbacks with this solution in terms of its very great constructional expenditure and very great spatial requirement. Additionally, there is rendered more difficult positive guiding and actuation of the gripper tongs or clamps in the change head owing to the locally tight spatial conditions. It is for this reason and because of the telescopic-type displacement of the carrier with large projection or cantilever lengths that it is not possible to use large and heavy tools.

SUMMARY OF THE INVENTION

Hence, it is a primary object of the present invention to provide a new and improved construction of tool changer for horizontal drilling-milling machines which is not associated with the aforementioned drawbacks and limitations of the prior art constructions.

Another and more specific object of the present invention aims at avoiding the above-discussed drawbacks and thereby realizing a better solution of an independent tool changer for horizontal drilling-milling machines with displaceable machine frame in which the tools are arranged in the magazine horizontally and at right-angles to the tool spindle for saving space.

Now in order to implement these and still further objects of the invention, which will become more readily apparent as the description proceeds, the invention is characterized by the combination of the following individual features:

a. At the magazine there are arranged guide tracks in which there is displaceable the gripper carriage by means of a first drive which serves for the introduction and retraction of the tool, and by means of a second drive which serves for accommodation to different sizes of tools, wherein the first drive is secured at the gripper carriage and the second drive is stationarily maintained in the direction of the guide tracks and both drives are coupled together.

b. At the gripper rocker there is pivotably mounted a gripper arm carrying the gripper vane in such a manner that its gripper arm shaft is directly and non-displaceably mounted in the gripper rocker and the gripper arm shaft and its extension, respectively, cross at right-angles and in spaced relationship the gripper rocker shaft.

c. The gripper rocker and the gripper arm are pivotable in such a manner that the symmetry axes of the gripper tongs or clamps in the magazine position of the gripper vane are directed parallel to the tool spindle and in the tool spindle position of the gripper vane at right-angles to the tool spindle as well as being disposed at right-angles to the connection line between the gripper rocker shaft and the tool spindle shaft at the shaft center point.

The tool changer of this invention combines the following advantages:

a. Shortened tool change times in that the transfer of the tools out of the park position into the tool spindle position as well as vice versa each directly occurs in one functional step.

b. Shortened tool change times in that the gripper carriage is displaceable in accordance with the momentary tool lengths and tool sizes into appropriate position.

c. There is insured for a tool change operation at the tool spindle also in the lower positions of the headstock above the workpiece table and above the chip channel.

d. Simpler construction of the single gripper arm for the mentioned portion of the course of the movement instead of two gripper slides and as concerns the guides there are required only one longitudinal or lengthwise guide and two pivotal guides.

e. There is insured for a certain operational independence without any disadvantage in that the gripper carriage is displaceable at the magazine both for the introduction and retraction of the tools as well as also for the accommodation to different sizes of tools and workpieces.

f. There is provided a rigid construction for use with heavy or massive and large tools by virtue of the direct non-displaceable mounting of a gripper arm in the gripper rocker, a compact gripper rocker-weight compensation and due to good static guiding conditions at the gripper carriage.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
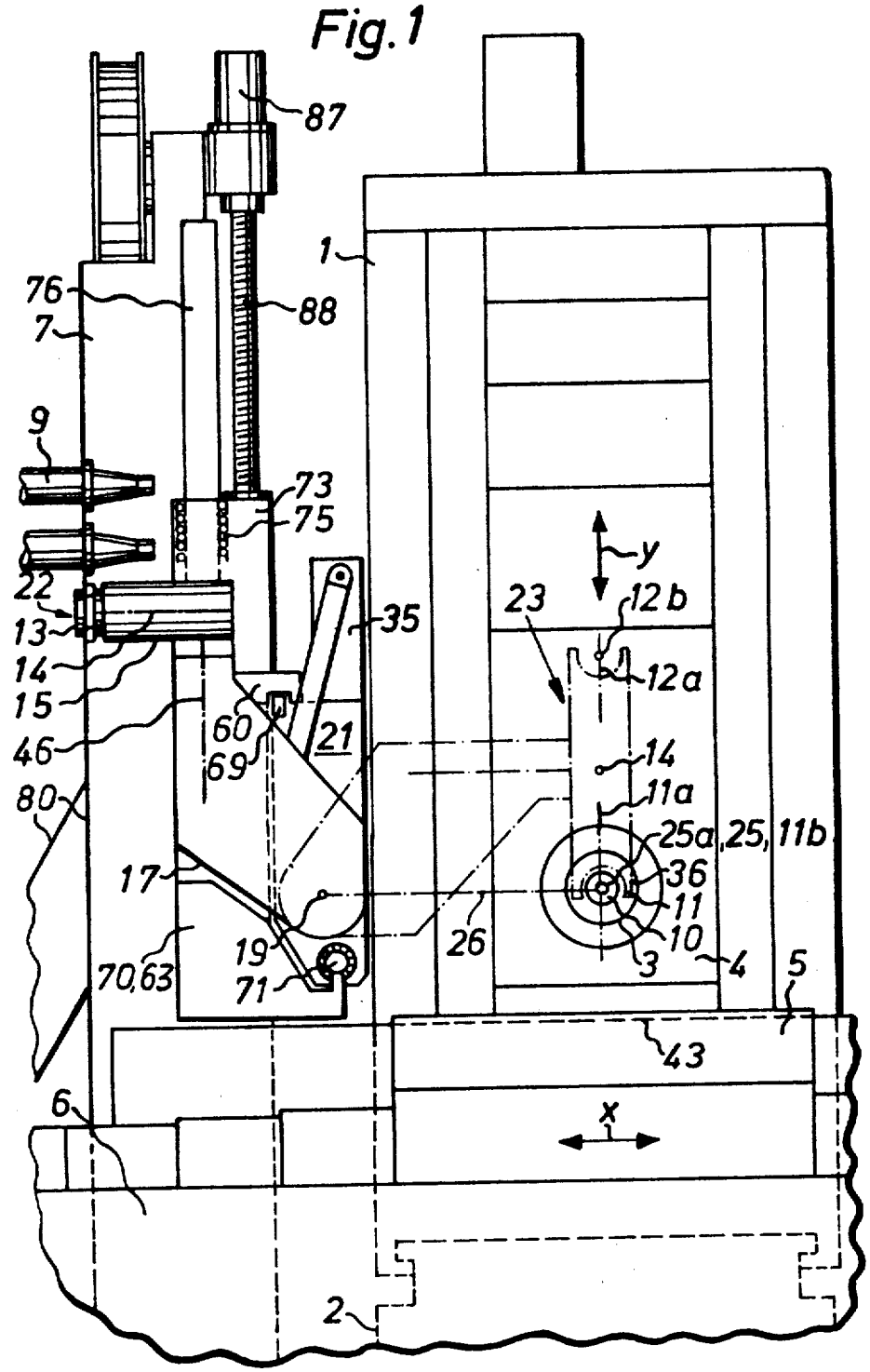
FIG. 1 is a front view of a tool changer and the horizontal drilling-milling machine wherein there has been illustrated the gripper vane in the magazine- and tool spindle position.

Describing now the drawings, the machine frame 1 carries out at the frame bed 2 the feed or advance movement in the Z-axis in the direction of the tool spindle 3. In the machine frame 1 there is mounted for vertical displacement the headstock 4 in the Y-axis. In front of this frame unit or frames means there is located a workpiece table 5 which is displaceable transversely with respect to the tool spindle 3 at the table bed 6 in the X-axis. Adjacent the frame unit and spaced therefrom there is located a tool magazine embodying the magazine chain 7. The tools 9 stored in the magazine chain 8 are arranged at right-angles to the tool spindle 3 and are removed and inserted in the direction of the tool spindle.

Figure 4:
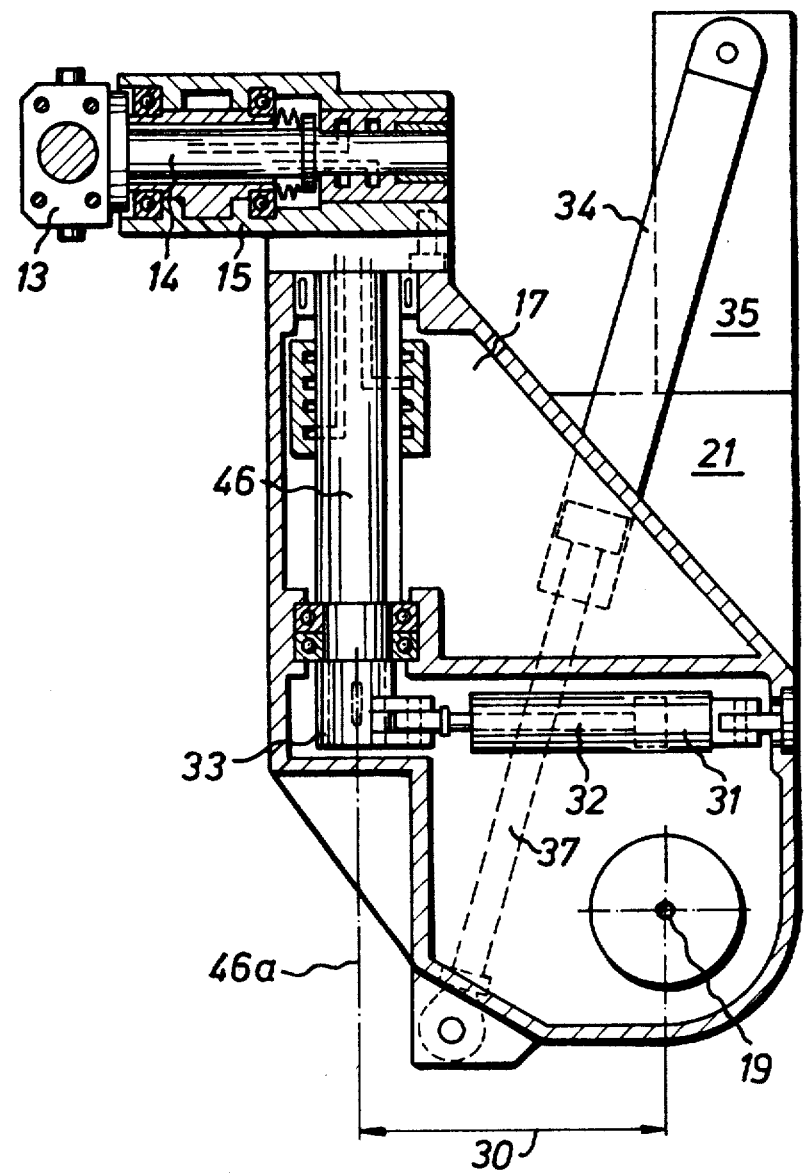
FIG. 4 is a cross-sectional view taken substantially along the line IV—IV of FIG. 3.
Figure 5:
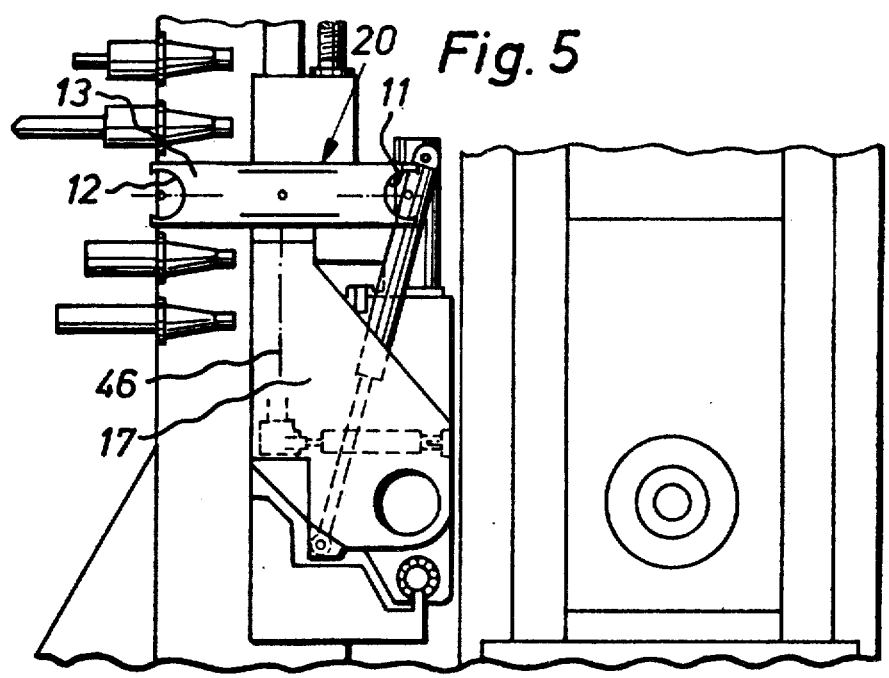
FIG. 5 is a sectional detailed showing of FIG. 1 with the gripper vane in the park or distribution position.

For the removal of a tool 9 out of the magazine chain 8 and for the transfer thereof to the tool receiver 10 of the tool spindle 3 and for the return movement there is provided a gripper mechanism having two gripper clamps or tongs 11, 12 which are arranged at a gripper vane 13 pivotable through an angle of 180° and which gripper clamps 11, 12 possess the symmetry axes 11a, 12a respectively. The gripper vane 13 is mounted by means of the gripper vane axle or shaft 14 in a gripper arm 15 at which there is attached the gripper arm axle or shaft 46 at right-angles to the gripper vane axle or shaft 14. The shaft 46 is mounted to be pivotable in the gripper rocker or balance 17 but axially non-displaceable such that the extension 46a of the gripper arm shaft 46 intersects at a spacing 30 the gripper rocker axle or shaft 19 (FIG. 4). By means of the gripper arm 15, the gripper rocker 17 and the gripper rocker shaft 19 mounted in the gripper carriage or slide 21 displaceable parallel to the tool spindle 3, the gripper vane 13 can be rocked into a magazine position 22, a park or distribution position 20 (FIG. 5) and a tool spindle position 23, as shown in chain-dot lines in FIG. 1. In the magazine position the tools are exchanged at the magazine, in the park or distribution position the tools are held in a preparatory position at the tool spindle for the tool change operation, and in the tool spindle position the tools are exchanged at the tool spindle. In order to improve clarity in illustration the gripper clamps or tongs in all of the corresponding figures of the drawings have been illustrated without the tool clamped therein.

In the magazine position 22 the gripper arm 15 assumes a position at the upright disposed gripper rocker 17 in which the gripper vane shaft 14 is directed parallel to the tools 9 stored in the magazine, and wherein the symmetry axes 11a, 12a are located parallel to the tool spindle 3.

For positioning the gripper vane 13 in the park position 20 the gripper arm 15 is rocked through 90° by means of the work cylinder 31 hingedly connected internally of the gripper rocker 17 at right-angles to the gripper arm shaft or axle 46 with unchanged upright positioned gripper rocker 17. To this end the piston rod 32 engages by means of the hub lever 33 at the gripper arm shaft 46. By means of the gripper arm 15 there is replaced in a simplified manner both of the gripper slides of the conventional tool changer.

The transfer of the gripper vane 13 out of the park — into the tool spindle position occurs by rocking or pivoting the gripper rocker 17 with the gripper arm which is fixed relative thereto in such a manner that in the attained tool spindle position 23 the symmetry axis 11a of the gripper tong or clamp 11 is located at the shaft or axle center point 25 of the tool spindle 3 and perpendicular to the connection line 26 between the gripper rocker shaft 19 and the axle center point 25. In this regard the engagement center point 11b of the gripper tong or clamp 11 coincides with the axle center point 25. This geometric correlation results in a direct transfer in one functional step, insures for the position of the gripper vane axle or shaft 14 above the tool spindle 3 owing to the fact that the tool change operation can also occur in the low Y-position of the headstock 4 above the clamping surface of the workpiece table 5 as well as above the chip channel 43 and renders possible a minimum opening angle of the gripper tongs. The rocking action is brought about by the work cylinder 34 which is hingedly connected by means of the holder 35 at the gripper carriage 21 and the piston rod 37 of which engages at the gripper rocker or balance 17.

Figure 7:
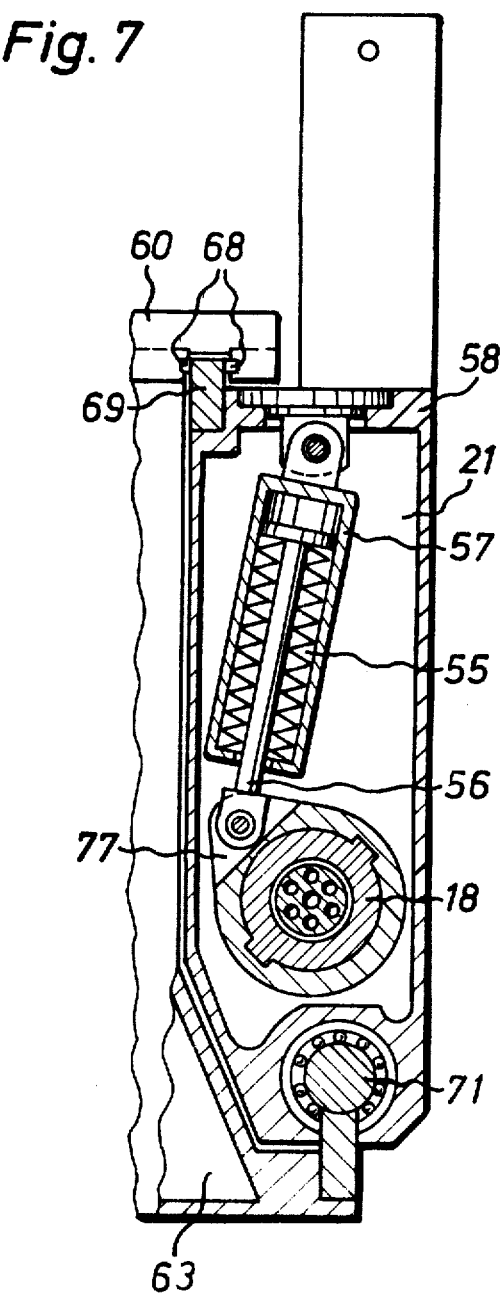
FIG. 7 is a sectional view on an enlarged scale taken substantially along the line VII—VII of FIG. 3.

In order to balance the weight which comes into play at the gripper rocker 17 and for the reduction of the forces at the work cylinder 34, and as best seen by referring to FIG. 7, there is pivotably arranged a plate spring column 55 in the gripper carriage 21. For the force transmission the traction or pull rod 56 is articulated at a hub 77 fixedly seated at the axial sleeve 18 and the pivot sleeve 57 is articulated to the horizontal cover surface 58 of the gripper carriage. This arrangement which is accommodated to the prevailing conditions results in a minimum of expenditure and mass because the force-displacement path of the plate spring column is used twice, namely for the right- and for the left-rotating weight moment with advantageous relation of the force-displacement path to the work path at the gripper rocker shaft.

Figure 3:
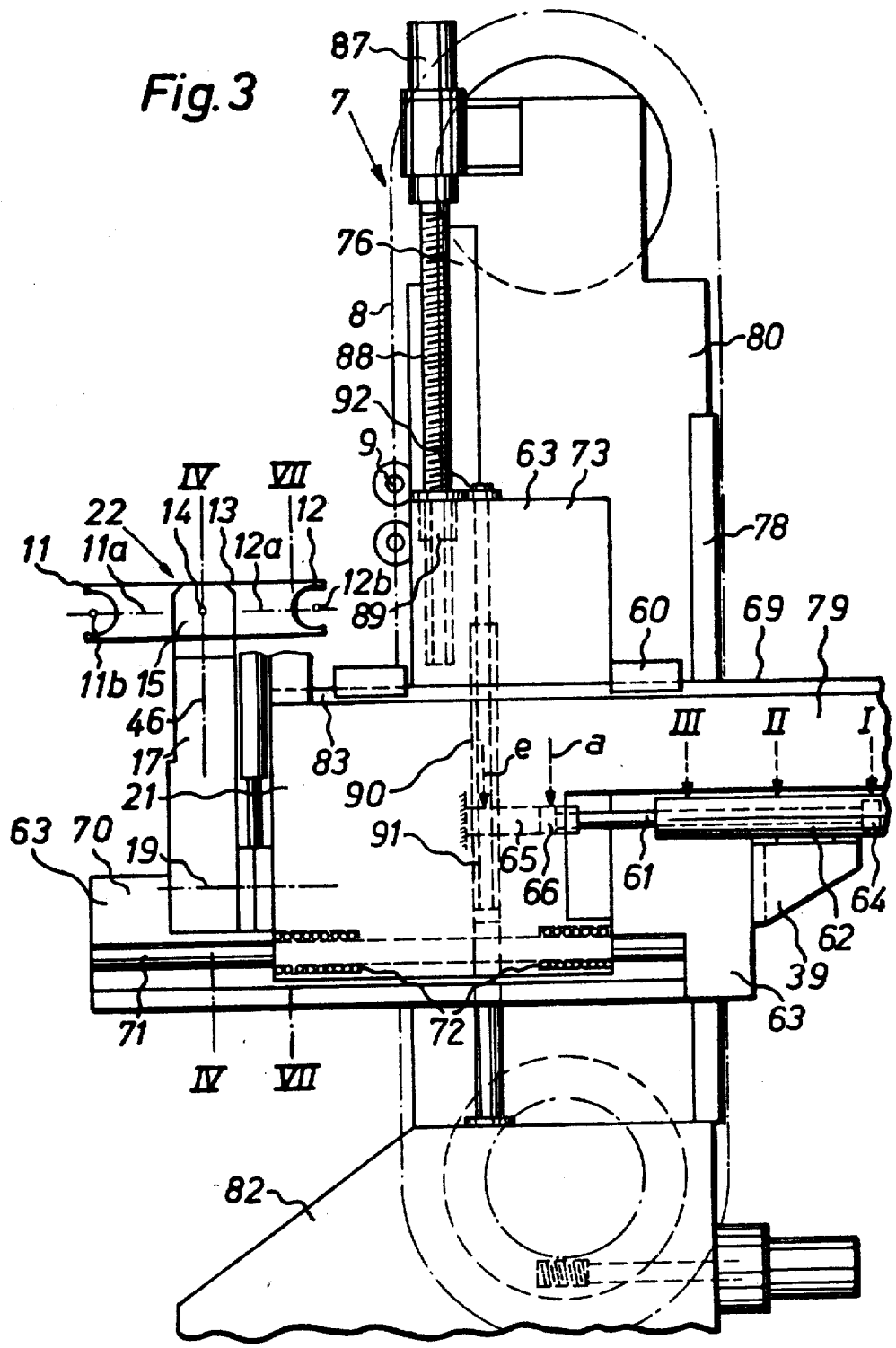
FIG. 3 is a side view of the tool changer wherein the gripper vane has been illustrated in the magazine position.
Figure 6:
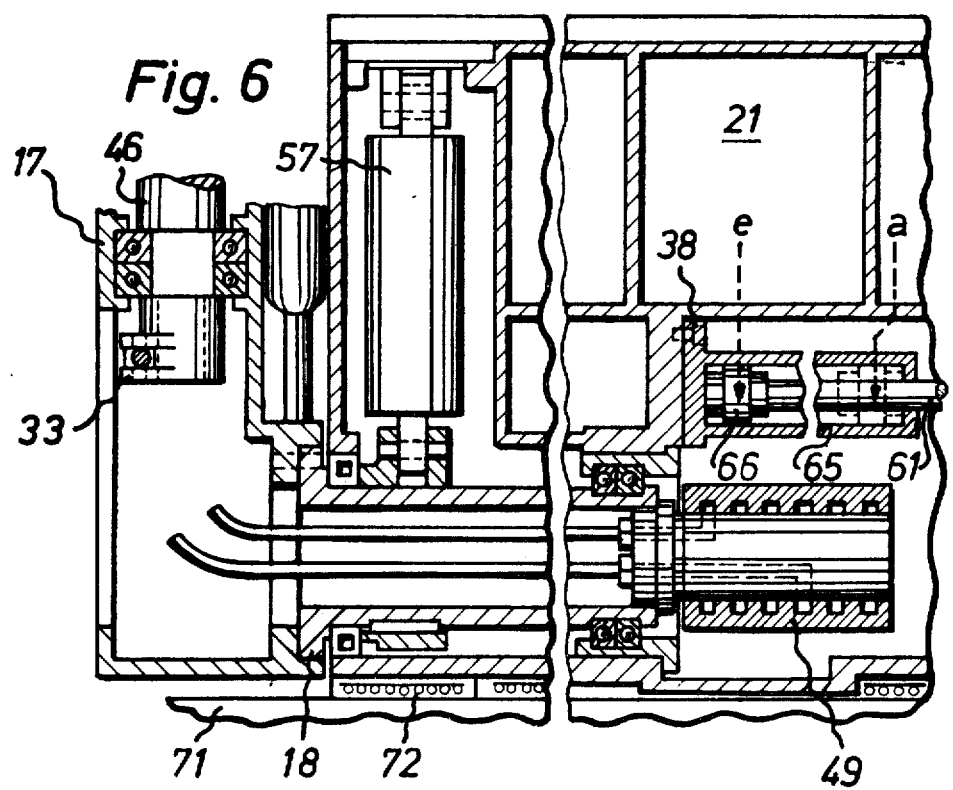
FIG. 6 is a longitudinal sectional view on an enlarged scale through the front portion of the gripper carriage.

The gripper carriage or slide 21 is guided at the magazine carriage 63 as will be described more fully hereinafter. For its displacement there are provided two work cylinders with different stroke ranges and which operate with a common piston rod 61 as shown in FIG. 3. The long work cylinder 62 serves for the advance or infeed of the gripper carriage 21 in three positions which are positionally related to the three positions of the machine frame 1 and the tool spindle 3 respectively and can be selectively programmed in accordance with the momentary tool lengths and workpiece size. The long work cylinder 62 is attached by means of the block or support 39 at the rear vertical outer surface of the magazine carriage or slide 63 and its piston 64 can assume in known manner by means of an impact piston three impact or contact positions. The short work cylinder 65 serves for the introduction and retraction of the tool at the magazine chain 8 and at the tool spindle 3. As best seen by referring to FIG. 6 it is attached by means of the holder element or piece 38 at the gripper carriage or slide 21 and its piston 66 can assume two positions $e$, $a$. In the position $a$ a tool at the magazine or at the tool spindle is moved out or ejected and in the position $e$ such tool is introduced.

Figure 2:
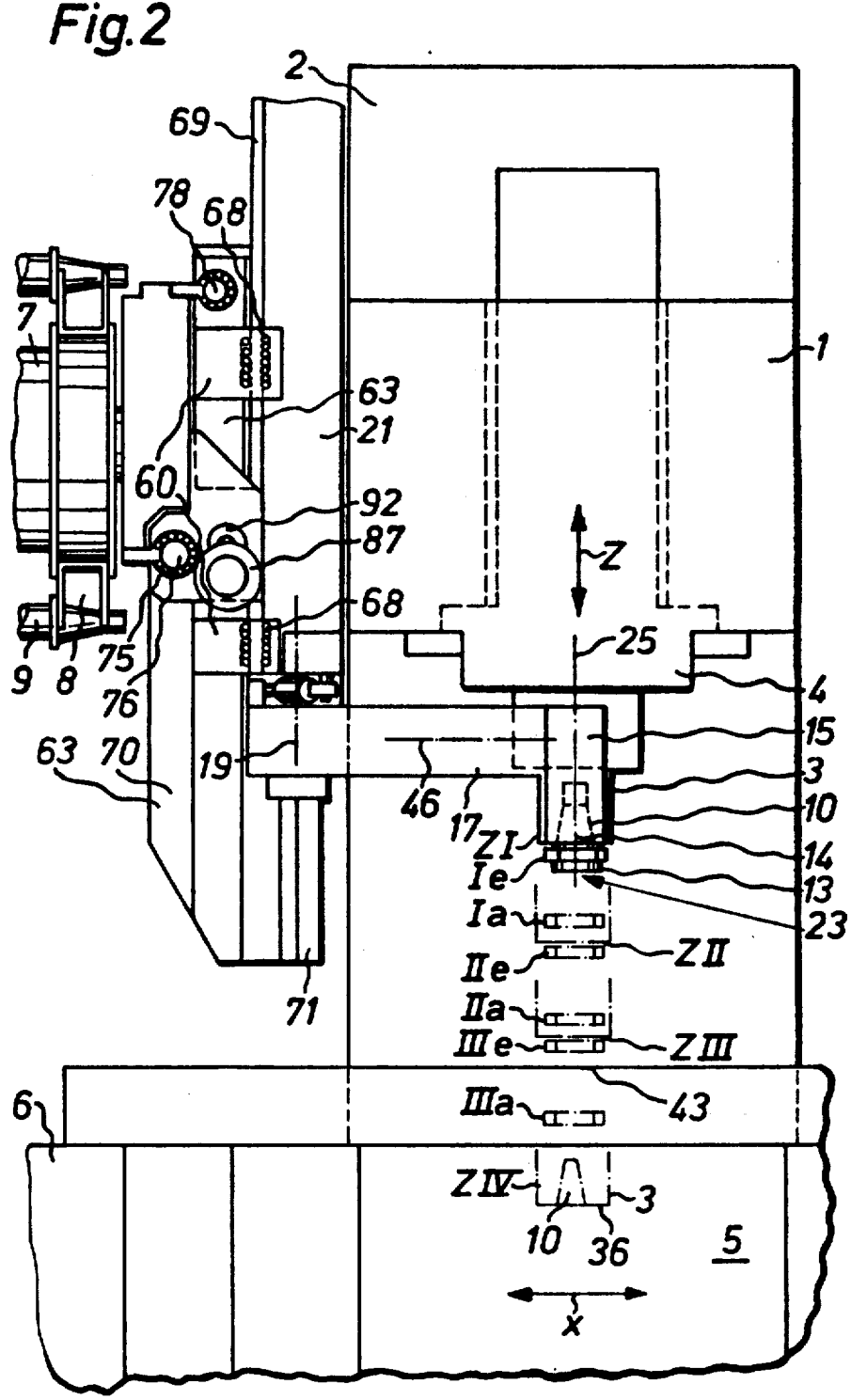
FIG. 2 is a plan view of the tool changer of FIG. 1 wherein the gripper vane has been illustrated in the tool spindle position.

In the position $e$ of the piston 66 the gripper carriage alternately assumes the three positions I$e$, II$e$, III$e$ according to FIG. 2 with the gripper tongs with appropriate impingement of the long work cylinder 62. These positions are positionally related in the tool spindle positions 23 of the gripper vane in such a manner to three frame- or tool spindle positions of the machine Z-axis ZI, ZII, ZIII and which positions are provided for the tool change operation and selectively programable, so that the corresponding gripper tong can engage the tool clamped in the tool spindle 3. For the ejection of the tool out of the tool spindle the short work cylinder 65 is impinged with pressure in such a way that its piston 66 assumes the position $a$ and the gripper carriage with the gripper vane alternately assumes the positions I$a$, II$a$, III$a$. The tool spindle position ZIV, is the front terminal position. In the region between ZIII and ZIV there is not necessary any tool exchange operation. The position ZI is the rearward terminal position, which is only then programmed when there are to be exchanged extremely long tools at large size workpieces. To this end the machine frame must be extensively displaced, whereby of course there results a longer change time from section to section, than when ZII or ZIII are programmed for shorter tools. In the positions le and la respectively of the gripper carriage there also always occur the tool change or exchange operation at the magazine. FIG. 3 illustrates the gripper carriage in the position la.

Instead of the long work cylinder 62 illustrated in the exemplary embodiment there can also be employed an infinitely adjustable drive which becomes effective in the described manner or which is impinged by a feeler regulator-control connected between the gripper carriage 21 and the headstock 4 in order to insure for during the tool change operation at the tool spindle the positionally-related position between the gripper vane 13 and the tool spindle 3.

The gripper carriage 21 is of angular configuration with a horizontal long leg 79 and a vertical short leg, as best seen by referring to FIG. 3. For the guiding thereof there is threaded at the upper or outer horizontal side of the long leg the upper guide track 69. It cooperates with roller elements 68 which are attached at the magazine carriage or slide 63 with the aid of two holder plates 60. At the magazine carriage 63 there is machined the cantilever or overhang arm 70 which carries the lower guide track 71. Cooperating with such lower guide track 71 are the roller elements 72 which are mounted at the outer horizontal side of the short leg. This particular guide arrangement in which the upper guide track 69 is located behind the pivotal region of the gripper rocker 17 at the gripper carriage and the lower guide track 71 is located at the magazine carriage or slide 63 below the pivotal region of the gripper rocker, insures for optimum static guiding conditions in that the guide tracks with effective narrow guiding in each individual track are located so as to be situated relatively widely spaced from one another, there is avoided a free cantilever of the gripper carriage and the force of the work cylinder arrangement 62, 65 advantageously engages at the gripper carriage. Contributing thereto is the angular-shaped configuration of the gripper carriage which also provides space for a simple pressurized oil infeed for actuating all work cylinders located in or at the gripper rocker 17 respectively, by means of the rotary bushing 49, as best seen by referring to FIG. 6.

Apart from the good static guiding conditions this gripper carriage 21 prevents a free cantilevering. Consequently, there is not reduced the great rigidity of the gripper apparatus owing to the gripper arm 15 which is fixedly axially mounted in the gripper rocker 17 and there is possible the use of massive or heavy tools and multi-spindle drilling heads.

The drawings illustrate in the exemplary embodiment that the tool change or tool exchange operation can occur in each Y-position. For this purpose the magazine carriage 63 is guided in vertical direction at the guide tracks 76 and 78 located at the magazine frame or support 80.

Its displacement occurs by means of the motor 87 which is controlled in such a way that it together with the ball spindle 88 forms a displacement path measuring control chain which, by means of the ball nut 89, displaces or introduces the magazine carriage 63 before each tool change at the tool spindle into the required positionally-related vertical position. For facilitating this function there is employed the weight-compensation cylinder 90 which is attached to the magazine pedestal or base 82, and the piston rod 91 of which cylinder engages by means of the holder 92 at the guide extension 73 of the magazine carriage 63.

While there is shown and described present preferred embodiment of the invention, it is to be distinctly understood that the invention is not limited thereto, but may be otherwise variously embodied and practiced within the scope of the following claims. Accordingly,

I claim:

1. A horizontal drilling-milling machine comprising:
   1. a machine frame;
   2. a tool spindle horizontally mounted on said machine frame;
   3. a magazine arranged adjacent said machine frame, said magazine having a plurality of tools arranged horizontally in said magazine and extending at right angles to said tool spindle, said tools being retrievable from said magazine and insertable in the tool spindle in a direction parallel to said tool spindle;
   4. guide tracks arranged adjacent the magazine and parallel to said tool spindle;
   5. a gripper carriage displaceably mounted for movement upon the guide tracks in a direction parallel to the tool spindle;
   6. a tool changer means mounted on said gripper carriage for moving a tool from the magazine to the tool spindle and for moving a tool from the tool spindle to the magazine, said tool changer means comprising,
      a. a gripper rocker mounted on said gripper carriage and swingable about a first axis parallel to said tool spindle,
      b. means connected to said gripper rocker for swinging said gripper rocker about said first axis,
      c. a gripper arm mounted on said gripper rocker and swingable about a second axis extending in spaced relationship from and at right angles to said first axis,
      d. means connected to said gripper arm for swinging said gripper arm about said second axis,
      e. a gripper vane mounted on said gripper arm, swingable about a third axis extending at right angles to said second axis, said gripper vane having tool gripping clamps mounted thereon,
      f. means connected to said gripper vane for swinging said gripper vane about said third axis from a first position to a second position such that said gripper clamps are selectively positioned adjacent a tool in said magazine and adjacent said tool spindle;
2. cylinder and piston means for displacing said gripper carriage in different positions upon the guide tracks including,
   a. a first cylinder secured to the gripper carriage for effecting tool change, said first cylinder having therein a first displaceable piston,
   b. a second cylinder operatively connected with the guide tracks for displacing the gripper carriage during a work cycle, said second cylinder having therein a second displaceable piston,
   c. a piston rod interconnecting said pistons with one another.

2. The machine as defined in claim 1, wherein said means for swinging said gripper arm about said second axis comprises a gripper arm shaft connected to the gripper arm, a work cylinder connected to the gripper rocker and arranged substantially at right angles to the gripper arm shaft, said work cylinder having a displaceable piston therein and a piston rod connected at one end to said piston and hingedly connected at the other end to said gripper arm shaft.

3. The machine as defined in claim 1, wherein said gripper rocker is mounted on a gripper rocker shaft disposed on said first axis and including resilient means for balancing the weight of the gripper rocker as it swings about said first axis, said resilient means comprising a pivotal sleeve, means for pivotally mounting the sleeve to the gripper carriage, a traction rod disposed in the sleeve and pivotally mounted to the gripper rocker shaft and a plate spring column in said sleeve for urging said traction rod into said sleeve.

4. The machine as defined in claim 1, including a magazine carriage, a first one of said guide tracks being secured to said magazine carriage below said first axis, a second one of said guide tracks being secured to the gripper carriage above said first axis and spaced from said first guide track, first roller element means secured to said gripper carriage for guiding said first guide track and second roller element means secured to said magazine carriage for guiding said second guide track.

\* \* \* \* \*